(No Model.)

A. T. PFEIFF.
APPARATUS FOR STERILIZING MILK, CREAM, &c.

No. 578,899. Patented Mar. 16, 1897.

Witnesses:
W. C. Pinckney
C. Holloway

Inventor:
Alexander Theodor Pfeiff,
By J. E. M. Bowen
Attorney.

UNITED STATES PATENT OFFICE.

ALEXANDER THEODOR PFEIFF, OF COPENHAGEN, DENMARK.

APPARATUS FOR STERILIZING MILK, CREAM, &c.

SPECIFICATION forming part of Letters Patent No. 578,899, dated March 16, 1897.

Application filed July 18, 1896. Serial No. 599,637. (No model.) Patented in England April 13, 1896, No. 7,802.

*To all whom it may concern:*

Be it known that I, ALEXANDER THEODOR PFEIFF, of Copenhagen, Denmark, have invented certain new and useful Improvements in Apparatus for Sterilizing Milk, Cream, and other Liquids by Means of Steam, (for which I have obtained Letters Patent of Great Britain, No. 7,802, dated April 13, 1896,) of which the following is a specification.

This invention relates to apparatus for the sterilization of milk, cream, and other liquids by means of steam, in which the liquid may be heated to a high temperature near its boiling-point without acquiring a boiled taste.

My apparatus can sterilize a considerable quantity of liquid in a short time.

Figure 1:
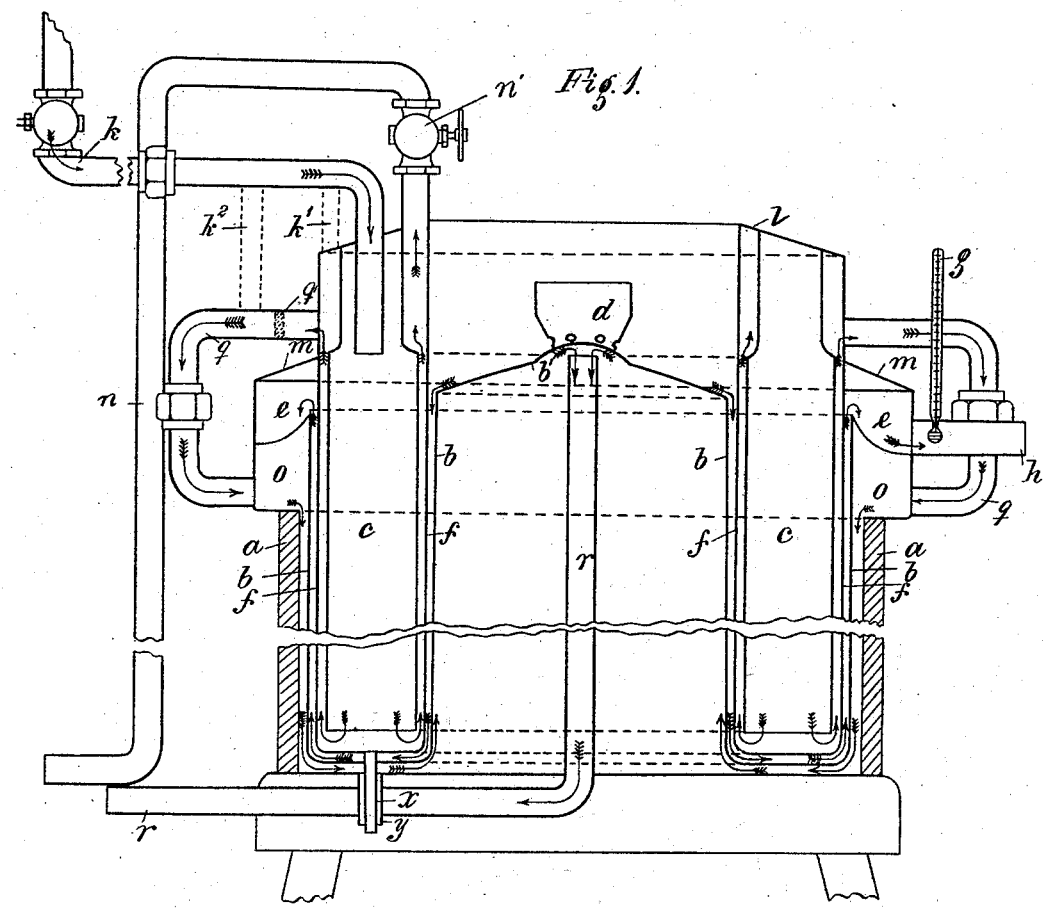
Figure 2:
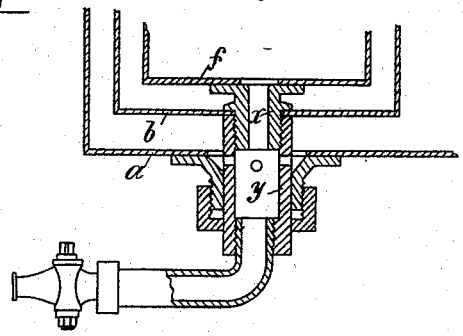

In the accompanying drawings, Figure 1 is a section of an apparatus made according to my invention. Fig. 2 is a detail.

$a$ is a vessel, inside which is arranged an annular vessel $b$, the inner wall of which projects above the outer wall and is provided with a lid $b'$. Above this lid is fixed an inlet-funnel $d$ for the liquid to be sterilized. Near the bottom of the funnel it is provided with small perforations or holes through which the liquid can pass. Inside the vessel $b$ is arranged another vessel $f$, also annular in form, and inside this, again, an inverted-U-shaped vessel or bell $c$. Above the vessel $f$ is a close-fitting lid $l$, to which the bell $c$ is suspended.

Steam is admitted to the apparatus through the pipe $k$ and first fills the interior of the bell $c$. At the bottom of the vessel $f$ the steam is divided into two streams, of which the one passes underneath the outer edge of the bell $c$ and up through the outer space between the bell $c$ and the vessel $f$. From this space the steam passes through the bent pipes $q$ and an annular channel $o$ into the outer space between the vessels $a$ and $b$, then underneath the bottom of the vessel $b$ into that part of the vessel $a$ that is underneath the lid $b'$, whence it escapes through the pipe $r$. The other portion of the steam passes underneath the inner edge of the bell $c$ and up through the inner space between the bell $c$ and the vessel $f$, from which the waste steam passes away through the pipe $n$. The outlet of this pipe may be regulated by means of a cock $n'$.

As shown in dotted lines in Fig. 1, steam may be introduced into the apparatus at several points through pipes $k'$ and $k^2$, provided with cocks. A more effective operation is thus obtained. If steam is admitted through the pipe $k^2$, the bent tube $q$ must be closed up, as shown at $q'$ in dotted lines.

The liquid which is to be sterilized is, as above mentioned, admitted into the funnel $d$ and passes through the perforations or holes in the bottom of this funnel radially over the lid $b'$ to the space between the vessels $b$ and $f$. The liquid then passes underneath the bottom of the vessel $f$ and up through the outer space between the vessels $b$ and $f$ to the annular channel $e$, from which it issues through a pipe $h$, in which is inserted a thermometer, by means of which the temperature of the liquid may be ascertained.

In the bottom of the vessels $a$ and $f$ are arranged outlet-pipes $x$ and $y$ in convenient positions for the escape of the water arising from the condensed steam, the said pipes $x$ and $y$ being so arranged that they do not prevent the steam from passing freely up through the narrow spaces between the walls of the vessels. In Fig. 2 a somewhat modified construction of this arrangement is shown.

My apparatus possesses great advantages above those used hitherto and combines sure action with efficiency.

In apparatus of a similar kind water has hitherto been used as a heating agent. The water flowed in a single stream through the apparatus, and as it was not subjected to any pressure the hottest liquid, as a rule, remained at the top. During this operation the water became little by little so much cooled that it had no effect on the liquid to be sterilized. As a rule the liquid was collected in channels, but these were not capable of receiving all the liquid. By reason of this defect the efficiency of the apparatus was low, as a part of the cold liquid remained in the apparatus and did not circulate. The liquid was, moreover, led away from the center of the apparatus, and in order to obtain the necessary pressure the lid on the inner central part of the vessel $a$ had to be placed below the outer edge of the same vessel. As a result of this arrangement the liquid to be sterilized formed a thick layer upon the said lid, and the cold liquid that always flowed into the apparatus at the center passed directly into the apparatus, while the part already heated remained still and exposed to deterioration, especially when liquid was milk or cream. The liquid composing the layer upon the lid of the vessel acquired a temperature that was considerably higher than the temperature acquired by the liquid flowing into the apparatus, so that the latter liquid being colder and consequently heavier the circulation of the already-heated liquid was retarded. In the present apparatus these drawbacks are completely avoided. The steam passes, as already mentioned, in two streams through the apparatus and will affect the liquid on both sides during the whole of the circulation of the liquid through the apparatus. This result is obtained by means of the inverted-U-shaped bell $c$ and the close-fitting lid $l$, which compel the steam to pass through the apparatus under pressure and divide itself in the aforesaid manner. The outer and inner spaces through which the liquid passes are furthermore connected by means of the annular space $e$, thereby allowing a free passage. As the liquid is admitted through the funnel $d$ and passes in a thin layer over the lid $b'$ it will be heated immediately it flows into the apparatus, which, in the case of milk and cream, causes the animal smell to be removed and prevents the liquid from remaining still. The opening of the exhaust-pipe $r$ is arranged just underneath the convex or upwardly-bulged part of the lid $b'$, which causes a perfect and efficient circulation of the steam at this point.

The steam in the interior of the bell $c$ will not directly influence the liquid, but its influence will be felt in the spaces between the bell $c$ and the vessel $f$, where the temperature has already dropped slightly. By this means the burning of the milk is avoided, and the inside of the bell $c$ will form a heat-reservoir for the steam passing through the inner space, which steam will thus not be cooled too much by meeting the liquid flowing into the apparatus.

Having thus described my invention, what I claim as new, and desire to secure by Letters Patent, is—

1. In an apparatus for sterilizing milk and other liquids, the combination with an exterior vessel, two interior annular vessels closed at their bottoms and of such relative cross-sections as to provide channels between the same and between the outer annular vessel and said exterior vessel, a closely-fitting lid over the innermost annular vessel, and an inverted bell suspended from said lid and extending to near the bottom of said innermost annular vessel, of means for admitting steam into said bell which divides into two streams in its passage through the apparatus, means for exhausting the steam from the apparatus, and means for admitting between said annular vessels the liquid to be sterilized and for discharging the same from the apparatus, substantially as set forth.

2. The combination with an exterior vessel, an annular vessel of less diameter arranged therein, a closely-fitting lid over the inner wall of said annular vessel and a second annular vessel arranged inside the first-mentioned annular vessel and of smaller cross-section, of a lid closely fitting over the top of the inner annular vessel, an inverted bell extending into said interior annular vessel to near its bottom, a pipe adapted to admit steam into said bell, exterior steam connections furnishing communication between said interior annular vessel and said exterior vessel, means for exit of the heating medium, and means for admitting the liquid to be sterilized between said annular vessels and for discharging the same from the apparatus, substantially as set forth.

3. The combination with an exterior vessel, two annular vessels arranged therein and of different cross-sections and of less diameter than said exterior vessel, a lid covering the top of the innermost annular vessel, an inverted bell extending into said innermost annular vessel, and means for admitting steam into said bell and permitting its passage in two streams from said innermost annular vessel, of a lid closely fitting over the inner wall of the exterior annular vessel and provided with an upwardly-bulged central portion, a steam-exhaust pipe the inner open end of which is within the bulged portion of said lid, and means for admitting the liquid to be sterilized between said annular vessels and for discharging the same from the apparatus, substantially as set forth.

4. The combination with an exterior vessel, two annular vessels arranged therein and of different cross-sections and of less diameter than said exterior vessel, a lid covering the top of the innermost annular vessel, an inverted bell extending into said innermost annular vessel and means for admitting steam into said bell and permitting its passage in two streams through the apparatus, of a lid closely fitting over the inner wall of the exterior annular vessel, a steam-exhaust pipe the open end of which extends from near the under surface of said lid, and a funnel to receive the liquid to be sterilized provided with small perforations and arranged at the top of said lid whereby said liquid passes in a thin layer over said lid into the space between said annular vessels, substantially as set forth.

5. The combination with the exterior vessel $a$, the interior annular vessels $b$ $f$, inverted bell $c$, and lids covering annular vessel $f$ and the inner wall of annular vessel $b$, of means for admitting steam into the apparatus and for exhausting the same in two streams, and discharge-outlets for the water of condensation connected to the bottoms of said exterior vessel $a$ and the interior annular vessel $f$, substantially as set forth.

6. The combination with exterior vessel $a$, and interior annular vessels $b\ f$, said exterior vessel $a$ and annular vessel $f$ connected by pipes $q$ and channel $o$ at the top of exterior vessel $a$, of steam inlet and outlet pipes and means for admitting the liquid to be sterilized between said annular vessels and discharging the same from the apparatus, substantially as set forth.

7. The combination with the exterior vessel $a$, interior annular vessels $b\ f$, and an annular channel $e$ at the top of annular vessel $b$, of inverted bell $c$, lids $b'\ l$, means for conducting steam through the apparatus and discharging the same therefrom and means for admitting the liquid to be sterilized between annular vessels $b\ f$ and discharging the same from the apparatus, substantially as set forth.

In testimony that I claim the foregoing as my invention I have signed my name in presence of two subscribing witnesses.

ALEXANDER THEODOR PFEIFF.

Witnesses:
 HOFMAN BANG,
 JULES BLOM.